US009202245B2

(12) United States Patent (10) Patent No.: US 9,202,245 B2
Kostka et al. (45) Date of Patent: Dec. 1, 2015

(54) WIRELESS BEACON AND METHODS

(71) Applicant: Estimote, Inc., Walnut, CA (US)

(72) Inventors: Lukasz Kostka, Walnut, CA (US); Jakub Krzych, Walnut, CA (US)

(73) Assignee: Estimote Polska SP. Z O.O. (PL)

( * ) Notice: Subject to any disclaimer, the term of this patent is extended or adjusted under 35 U.S.C. 154(b) by 0 days.

(21) Appl. No.: 14/463,582

(22) Filed: Aug. 19, 2014

(65) Prior Publication Data

US 2015/0079942 A1 Mar. 19, 2015

Related U.S. Application Data

(60) Provisional application No. 61/867,493, filed on Aug. 19, 2013, provisional application No. 61/867,498, filed on Aug. 19, 2013.

(51) Int. Cl.
| | |
|---|---|
| *H04M 1/66* | (2006.01) |
| *G06Q 30/06* | (2012.01) |
| *H04W 4/12* | (2009.01) |
| *H04W 76/02* | (2009.01) |
| *H04W 88/08* | (2009.01) |
| *H04W 4/02* | (2009.01) |
| *H04W 4/20* | (2009.01) |

(52) U.S. Cl.
CPC ........ *G06Q 30/0633* (2013.01); *G06Q 30/0641* (2013.01); *H04W 4/02* (2013.01); *H04W 4/021* (2013.01); *H04W 4/12* (2013.01); *H04W 4/206* (2013.01); *H04W 76/021* (2013.01); *H04W 88/08* (2013.01)

(58) Field of Classification Search
CPC .......... G06Q 30/0633; G06Q 30/0641; H04W 4/206; H04W 4/021; H04W 4/02; H04W 4/12; H04W 88/08; H04W 76/021

USPC .......................................................... 455/411
See application file for complete search history.

(56) References Cited

U.S. PATENT DOCUMENTS

| | | | | |
|---|---|---|---|---|
| 8,644,255 | B1 * | 2/2014 | Burcham et al. | 370/331 |
| 8,694,782 | B2 * | 4/2014 | Lambert | 713/168 |
| 2002/0167919 | A1 | 11/2002 | Marples et al. | |
| 2003/0100315 | A1 * | 5/2003 | Rankin | 455/456 |
| 2006/0163349 | A1 | 7/2006 | Neugebauer | |
| 2009/0327135 | A1 * | 12/2009 | Nguyen et al. | 705/44 |
| 2010/0093374 | A1 | 4/2010 | DaCosta | |
| 2011/0305228 | A1 | 12/2011 | Cordeiro | |
| 2012/0095805 | A1 | 4/2012 | Ghosh et al. | |
| 2012/0190386 | A1 | 7/2012 | Anderson | |
| 2012/0316960 | A1 | 12/2012 | Yang | |
| 2013/0182625 | A1 * | 7/2013 | Kuehnel et al. | 370/311 |

(Continued)

*Primary Examiner* — Juan A Torres
(74) *Attorney, Agent, or Firm* — Jeffrey Schox; Thomas Gwinn

(57) ABSTRACT

A method for distributing micro-location-based notifications to a computing device, including: receiving a unique identifier from a first entity, the unique identifier collected from a wireless beacon by a computing device proximal the wireless beacon, the unique identifier generated locally on the wireless beacon according to a rule assigned to the wireless beacon; resolving the unique identifier into an identity of the wireless beacon based on the rule; identifying a second entity affiliated with the wireless beacon based on the identity of the wireless beacon; and in response to agreement between the first entity and the second entity, authorizing delivery of a communication through a native application executing on the computing device responsive to receipt of the unique identifier at the computing device, the communication affiliated with the first entity.

23 Claims, 5 Drawing Sheets

(56) References Cited

U.S. PATENT DOCUMENTS

| | | |
|---|---|---|
| 2013/0203445 A1 | 8/2013 | Grainger et al. |
| 2013/0337771 A1* | 12/2013 | Klein et al. ............... 455/411 |
| 2015/0031388 A1* | 1/2015 | Chatterjee et al. ....... 455/456.1 |

* cited by examiner

WIRELESS BEACON AND METHODS

CROSS-REFERENCE TO RELATED APPLICATIONS

This invention claims the benefit of U.S. Provisional Application No. 61/867,493, filed on 19 Aug. 2013 and to U.S. Provisional Application No. 61/867,498, filed on 19 Aug. 2013, which are both incorporated in their entireties by this reference.

TECHNICAL FIELD

This invention relates generally to the field of wireless communication, and more specifically to a new and useful method for distributing notifications in the field of wireless communication.

DESCRIPTION OF THE EMBODIMENTS

The following description of the embodiments of the invention is not intended to limit the invention to these embodiments, but rather to enable any person skilled in the art to make and use this invention.

1. First Method

Figure 1:
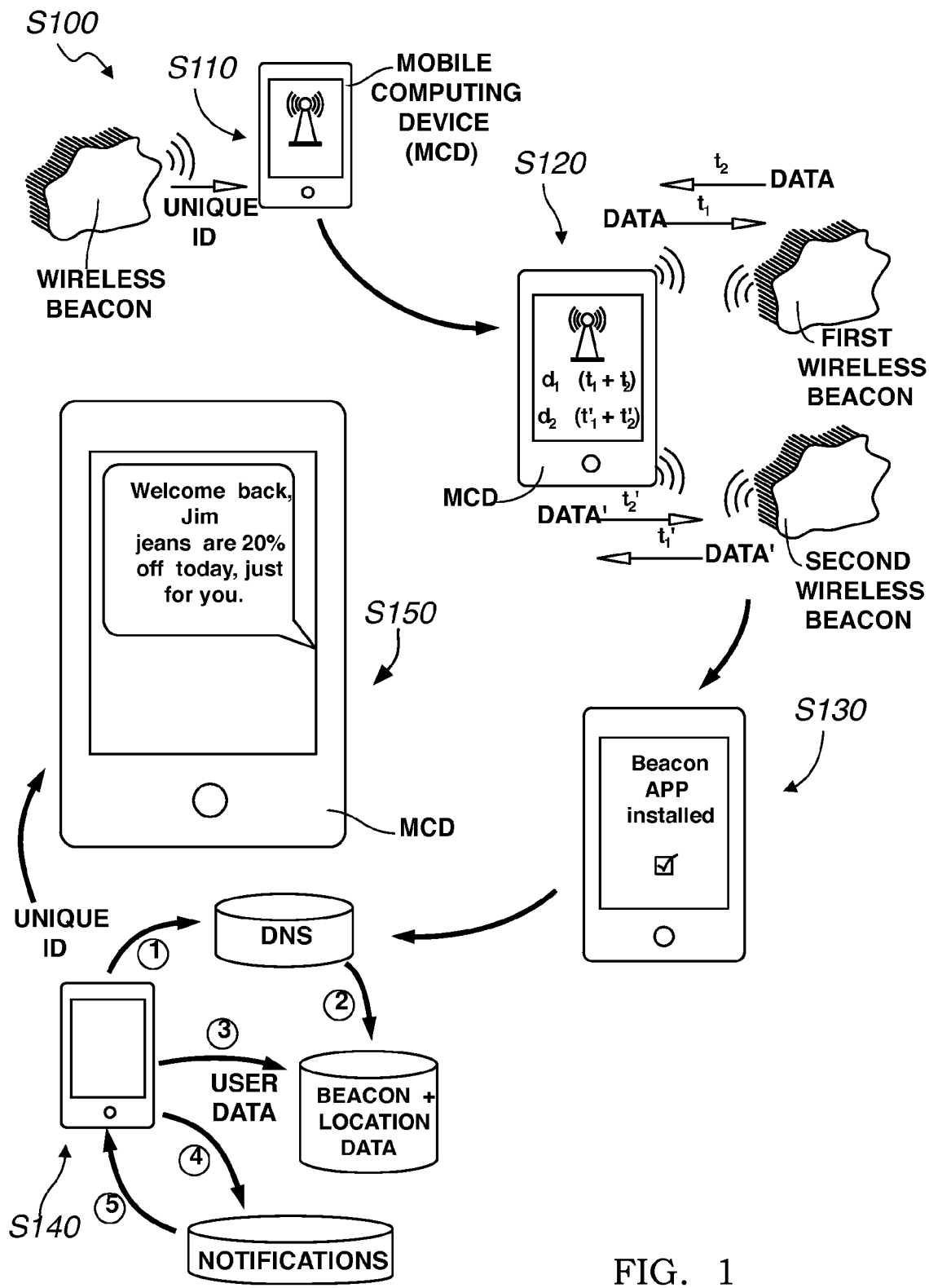
FIG. 1 is a flowchart representation of a first method in accordance with the invention.

As shown in FIG. 1, a method S100 for distributing microlocation-based notifications to a mobile computing device includes: wirelessly receiving a unique identifier from a wireless beacon in Block S110; estimating a proximity of the mobile computing device to the wireless beacon in Block S120; confirming user access to data associated with the wireless beacon in Block S130; retrieving a notification associated with the wireless beacon from a computer network in Block S140; and presenting the notification on the mobile computing device based on the estimated proximity of the mobile computing device to the wireless beacon in Block S150.

The method S100 can be implemented as a native application executing on a mobile computing device (e.g., a smartphone, a tablet) and interacting with a wireless beacon to estimate a location of the mobile computing device—and therefore a user—relative to the wireless beacon. The wireless beacon can include a water- and/or dust-resistant cover housing a battery, a wireless communication module, one or more sensors (e.g., an accelerometer, a gyroscope, a temperature sensor, etc.), and an adhesive backing. In one example, the wireless beacon can be placed (i.e., statically arranged) within a retail setting (i.e., retailer) such that, when a user enters the retailer with his mobile computing device executing a native retail application that implements the method S100, the mobile computing device and the beacon can interact to deliver micro-location-, product-, and/or user-specific data, deals, notifications, etc. to the use. In another example, multiple wireless beacons can be placed over various regions of the window of a display case within a bakery such that, when a user enters the bakery with his mobile computing device, the mobile computing device and various beacons cooperate to determine the user's position within the bakery and deliver product-related information to the user through the mobile computing device based on the estimated proximity of the user to a particular foodstuff within the display case.

The method S100 can therefore function to handle communications with one or more wireless beacons to deliver timely, location-specific notifications to a user through a mobile computing device, thereby supporting, guiding, and/or improving the user's shopping experience within a retail or similar setting.

Block S110 of the method S100 recites wirelessly receiving a unique identifier from a wireless beacon. Generally, Block S110 functions to handle communication between the wireless beacon and the mobile computing device (i.e., the native application executing on the mobile computing device and implementing the method S100). In one implementation, the wireless communication module within the wireless beacon can include a Bluetooth transceiver that transmits a unique identifier (ID), and the Block S110 can capture the unique identifier and pass the unique identifier to Block S130 to confirm access to additional data corresponding to the particular wireless beacon and/or to Block S140 to retrieve the additional data, such as from a domain name system (DNS). In this implementation, the wireless beacon can transmit the unique identifier to any device within range, rendering the unique identifier (and any additional data transmitted with the unique identifier) public (i.e., not private), but only devices with access to the DNS can retrieve information corresponding to the unique identifier, such as retailer data or product pricing, as described below. For example, Block S110 can pass a hashed beacon identifier into the DNS and the DNS can return a true identifier of the beacon to the mobile computing device, which is handled in subsequent Blocks to determine user access to the associated beacon data.

Alternatively, Block S110 can handle wireless communication with one or more beacons over Wi-Fi, cellular, or other radio-frequency communication or via any other suitable type of wireless communication protocol. The wireless beacon can also encrypt a transmitted signal, and Block S110 can receive and then decrypt the encrypted signal.

Block S110 can also receive additional data from the wireless beacon, such as accelerometer data, gyroscope data, temperature data, humidity data, and/or other relevant data from an accelerometer, gyroscope, temperature sensor, humidity sensor, and/or other sensor arranged within the wireless beacon, respectively. Alternatively, Block S140 can retrieve such additional data from the wireless beacon once communication between the wireless beacon and the mobile computing device is confirmed or established. Block S110 can further handle wireless communication with multiple wireless beacons substantially simultaneously, such as with up to eight discrete wireless beacons within range (e.g., 50 m) of the mobile computing device, as described below. However, Block S110 can function any other way to wirelessly receive a unique identifier or other data from the wireless beacon.

Block S120 of the method S100 recites estimating a proximity of the mobile computing device to the wireless beacon. In one implementation, Block S120 functions to estimate a physical distance between the mobile computing device and the wireless beacon based on a strength of the wireless signal received in Block S110 and/or based on a wireless signal received subsequently, wherein Block S120 correlates a strong wireless signal strength with a first distance between the mobile computing device and the wireless beacon and a weak wireless signal strength with a second distance between the mobile computing device and the wireless beacon more than the first distance. In another implementation, Block S120 transmits a data packet (e.g., a pseudorandom number) to the wireless beacon, subsequently receives a response to the data packet from the wireless beacon (e.g., the pseudorandom), and estimates a distance between the mobile computing device and the wireless beacon based on a total time between sending the data packet and receiving the response (i.e., a 'time of flight'), such as based on a known response latency (e.g., 'turn around' time) of the wireless beacon, as shown in FIG. 1.

Block S120 can also estimate an orientation of the mobile computing device relative to the wireless beacon. For example, Block S120 can receive accelerometer and/or gyroscope data from an accelerometer and/or a gyroscope arranged within the wireless beacon, retrieve accelerometer and/or gyroscope data from a corresponding sensor(s) within the mobile computing device, and then compare the mobile computing device and the wireless beacon accelerometer and/or gyroscope data to estimate an orientation of the mobile computing device relative to the wireless beacon. Block S120 can therefore estimate both a location and an orientation of the mobile computing device relative to the wireless beacon.

Figure 2:
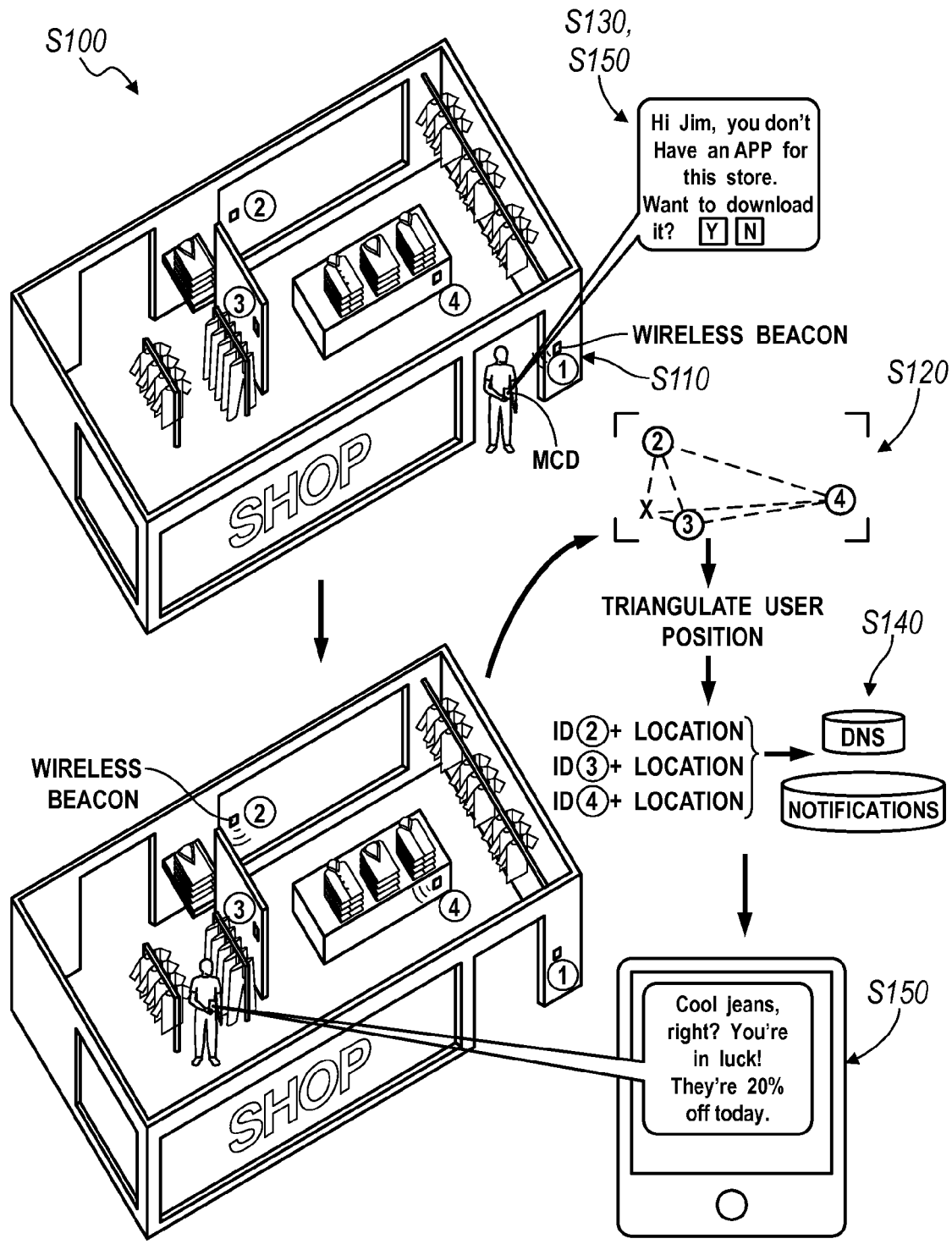
FIG. 2 is a flowchart representation of one variation of the first method.

In another implementation, Block S120 can interface with two or more wireless beacons to determine a position and/or orientation of the mobile computing device relative to the wireless beacons. In one example, Block S120 triangulates the position of the mobile computing device relative to two wireless beacons within a retail setting by estimating a distance between the mobile computing device and each beacon, receiving a distance estimate for the distance between the two beacons from at least one of the two beacons, and combining the three foregoing distance estimates into a map of the position of the mobile computing device relative to the two beacons, as shown in FIGS. 1 and 2. In this example, the mobile computing device and the beacons can estimate a distance to another object (i.e., a wireless beacon) based on time of flight of data transmitted between the mobile computing device and the wireless beacons, based on signal strength, or a based on any other suitable method or technique. In another example, Block S120 implements a zoning technique to estimate a position of the user relative to one or more beacons. In this example, each wireless beacon within a space can broadcast a signal of a particular strength such that wireless signals broadcast from adjacent wireless beacons do not overlap (or do not substantially overlap), and Block S120 predicts a user's location to be that of a particular location when the user's mobile computing device comes within range of the particular beacon. In this example, non-overlapping signal strengths can be set manually or learned automatically, such by automatically or manually increasing the broadcast signal strength from a first beacon until a second beacon nearby detects the broadcast signal from the first beacon and then reducing signal power by a factor of eight (i.e., $P(r=1)=P(r=2)\times(\frac{1}{2})^3$) for a spherical wireless broadcast volume. In yet another example, beacons with a space can broadcast wireless signals of different strength, such as in cycles of 0 dBm, 4 dBm, 0 dBm, 4 dBm, etc., and Block S120 can apply beacon signals of known strengths received by the mobile computing device to locate the mobile computing device relative to the beacon(s).

In the foregoing implementations, Block S120 can also retrieve a compass bearing from a beacon and implement the compass bearing to improve prediction of the location of the mobile computing device relative to the beacon(s) and/or to improve a beacon map for the corresponding space or venue, as described below.

Beacons within a space or venue can also automatically generate a mesh network and self-calibrate broadcast signal strengths by estimating distances between beacons within the network. For example, each beacon with a venue can listen for wireless signals (e.g., of substantially equivalent power) from all other beacons within range and save the strength and associated beacon identifier of each received signal. In this example, Block S120 (or other processor connected to the network of beacons) can then merge these signal strength and beacon identifier data into a map and/or graph of relative distances and relative positions of beacons. Block S120 can then implement the map and/or graph of relative distances and relative positions of beacons to estimate a relative location of a mobile computing device, such as described above.

Block S120 can handle visualization of the determined location and/or orientation of the mobile computing device relative to one or more wireless beacons within the space, such as by displaying such visualization in real-time on a display of the mobile computing device. In one example, each wireless beacon includes a color-coded housing (e.g., one of red, blue, yellow, pink, or green, etc.) and outputs a wireless signal containing an indicator of the housing color, and Block S120 can receive the indicator of the housing color of the wireless beacon and display this color on the mobile computing device display. In this example, Block S120 can adjust the opacity of the displayed color based on the estimated distance between the mobile computing device and a corresponding wireless beacon, wherein the opacity of the displayed color is substantially proportional to the estimated distance between the mobile computing device and the wireless beacon. Furthermore in this example, Block S120 can receive an indicator of the housing color of each of multiple wireless beacons and display a composite color that is a combination or 'blend' of the housing colors of the wireless beacons within range of the mobile computing device. In this example, the composite color can be a dynamic combination of the wireless beacon housing colors based on an estimated distance between each corresponding wireless beacon and the mobile computing device. Alternatively, in the foregoing example, Block S110 can pass the unique identifier of the wireless beacons to Block S140, Block S140 can retrieve beacon-specific data from a computer network (e.g., remote server) including the housing color of the corresponding wireless beacon, and Block S120 can implement the housing color retrieved in Block S140 to render the position and/or orientation visualization on the mobile computing device. However, Block S120 can display mobile computing device position and/or orientation data in textual format or in any other form or format on the mobile computing device.

Block S120 can therefore estimate the location and/or orientation of a mobile computing device relative to one or more wireless beacons of known location and/or orientation within a space (e.g., a retail setting). Block S120 can further pass this information to Block S140, and Block S140 can implement this data to select a particular notification or other data to push to the mobile computing device and display in Block S150. For example, a particular distance between the mobile computing device and a wireless beacon can be associated with a particular product within a retail space, and Block S140 can thus implement position data collected in Block S120 to select a notification specific to products associated with each position of a mobile computing device relative to each wireless beacon with the retail settings. Because a user can be associated with the mobile computing device, such as based on user login information within the native retail application, Block S120 can also store time-dependent estimated position and/or orientation data of the mobile computing device with the corresponding user (e.g., a user account), such as to track the user's movement throughout the space or venue. However, Block S120 can function in any other way to estimate the proximity of the mobile computing device to the wireless beacon and can implement this data in any other suitable way.

Block S130 of the method S100 recites confirming user access to data associated with the wireless beacon. Generally, Block S130 implements a check to determine that the user is authorized to access additional beacon data prior to delivery of additional beacon-related data in Block S150. In one example, a Retailer A-specific native shopping application executes on a user's mobile computing device, and the user enters a Retailer B storefront. In this example, the Retailer A-specific native shopping application implements Block S110 to receive a unique identifier from a beacon within the Retailer B storefront, implements Block S140 to identify the unique identifier as associated with Retailer B, and implements Block S130 to determine that a Retailer B-specific native shopping application is not yet installed on the user's mobile computing device. Block S130 can subsequently prompt the user to install the Retailer B-specific native shopping application on his mobile computing device and confirm access to Retailer B-specific beacon data once the install is complete, as shown in FIG. 2.

In the foregoing example, Block S130 further selectively execute the Retailer A- and Retailer B-specific native shopping applications responsive to the determined location of the mobile computing device (and therefore the user). In particular, when the user visits Retailer B at a later date, Block S130 can determine that the Retailer B-specific native shopping application is present on the user's mobile computing device and thus automatically confirm user access to Retailer B-specific beacon data while in the Retailer B storefront. In this example, Block S130 can similarly determine that the Retailer A-specific native shopping application is present on the user's mobile computing device and thus automatically confirm user access to Retailer A-specific beacon data while in the Retailer A storefront. A retailer-specific native shopping application can include additional shopping support systems particular to the retailer or to a retailer location, such as a store map, a store map/aisle/product cross-reference search feature, a shopping list, a customer service request system, etc. Thus, when the user enters a particular storefront or retailer location, Block S130 can interface with a wireless beacon arranged within or near the retail location to automatically trigger execution of a retailer- and/or retail location-specific native application on the mobile computing device, wherein the native application supports communication of addition product, location, retailer, or other data to the user and offers additional support to the user throughout his shopping period.

The method S100 can therefore function within a retailer support system that further includes an software development kit (SDK) and/or application programming interface (API) to support a representative of a retailer, business, location, or other entity in creating a native application to interface with one or more related wireless beacons and to deliver beacon-related data and notification to mobile computing devices, such as indoor navigation, marketing, check-in, and/or payment information based on communication events between a mobile computing device and various wireless beacons within a store, market, or other location. For example, the method S100 can support a retailer in mapping a beacon identifier to a unique uniform resource locator (URL) associated with a particular product such that a web browser application executing on a user's mobile computing device is directed to the corresponding URL when the mobile computing device in proximity to the particular beacon (and the corresponding particular product). In this example, the web browser can set a cookie in the mobile browser to connect offline user interaction content the particular product (and online user interactions), such as by passing a product-specific URL to the user's mobile computing device in response to receiving a particular beacon ID associated with the product on the DNS. The method S100 can further support the retailer in prioritizing beacon responses on a user's mobile computing device, such as setting a preferred, secondary, and tertiary beacon response for a set of beacons with a particular space with overlapping beacon signals. Similarly, the method S100 can support publishers in prioritizing content returned to a user's mobile computing device when beacons are detected nearby, such as based on bids from publishers.

The method S100 can also support a beacon fleet management interface. For example, the method can enable a retailer representative to access usage, location, status (e.g., battery level), and orientation (e.g., compass bearing) of various beacons within a particular retail space or location (i.e., venue) through a single online or native-application-based interface. The method S100 can similarly enable the retailer representative change a beacon name and/or unique identifier, etc. through the interface.

Block S140 of the method S100 recites retrieving a notification associated with the wireless beacon from a computer network. Generally, Block S140 functions to communicate with a computer network (e.g., a remote database) to retrieve information related to the wireless beacon based on the unique identifier received in Block S110 and to cooperate with Block S150 to collect and present personalized microlocation-based notification to the user through the mobile computing device. In one implementation, Block S140 passes the unique identifier received in Block S110 through a DNS (as described above) to identify the particular corresponding wireless beacon, as shown in FIGS. 1 and 2. Once the corresponding wireless beacon is identified by the DNS, the computer network can select a notification or other data to pass back to Block S140. In one example, a particular wireless beacon can be associated with a particular retailer storefront, and Block S140 can receive a welcome message (e.g., "Welcome to Caiti's Cakes) and a pending offer or deal (e.g., "Buy one cupcake and get one free"). In another example, a particular wireless beacon can be associated with a particular aisle within a retailer store location, and Block S140 can receive an aisle content description (e.g., "This is the households aisle") and a coupon for a product within the aisle ("Today only: 25% off hand soap"). In yet another example, Block S120 can pass distance and/or orientation data of the mobile computing device relative to one or more wireless beacons, the DNS can identify the corresponding wireless beacons, the computer network can extrapolate a particular product near the user according to the mobile computing device location and/or orientation relative to the identified wireless beacons, and Block S140 can receive a product description and pricing information for the particular product.

The computer network can therefore maintain a database of location, retailer, product, pricing, and/or other information for various beacons, selectively access data within the database based on one or more wireless beacons proximal the mobile computing device and identified through the DNS, and pass selected data to the mobile computing device via Block S140. A representative of a retailer, business, or location, etc. can thus access the SDK or API of the retailer support system described above to add, modify, and remove beacon-related or beacon-specific information in the database. For example, the representative can arrange various wireless beacons throughout a store and implement the SDK to upload a map of the store, product and wireless beacon locations within the store (e.g., in spreadsheet format), store and welcome information, customer service call prompts, and current and upcoming product information, pricing, and/or deals, etc. to the database. The database can then process the foregoing data to pair each wireless beacon within the store with one or more notifications, products (e.g., therefore product information), etc. in response to receive one or more unique identifiers via Block S110.

Block S140 can also pass additional data to the computer network. For example, Block S140 can pass accelerometer data, gyroscope data, temperature data, humidity data, a compass bearing, and/or other data collected from one or more wireless beacons in Block S110 to the computer network. Block S140 can additionally or alternatively pass accelerometer, gyroscope, GPS location, and/or other data collected through sensors arranged within the mobile computing device to the computer network. Furthermore, Block S140 can pass user data to the computer network, such as a link to an online social networking profile of the user or a demographic of the user (e.g., age, gender, occupation, ethnicity, etc.) stored in a user profile managed by a related native retail application executing on the user's mobile computing device, to the computer network, as shown in FIG. 1. The computer network can then apply any of this data to customize a notification for a user prior to pushing the notification back to the mobile computing device. For example, Block S140 can communicate a user visit frequency or a user loyalty indicator to the computer network (e.g., based on the number and dollar amount of user purchases from the store within a period of time), and the computer network can generate a product-specific discount for the user accordingly. In another example, Block S140 can send a user demographic to the computer network, and the computer network can customize the notification based on the user's demographic, such as by pushing a description of a male-specific deodorant rather than a female-specific deodorant to the mobile computing device for the user who is male in response to communication between the user's mobile computing device and a wireless beacon arranged within a personal hygiene aisle at a drug store. In yet another example, Block S140 can push time-dependent acceleration and position data of the mobile computing device to the computer network, and the computer network can estimate the amount of time a user has engaged a product, estimate a user interest in the product based on the estimated engagement time, and customize a discount or depth of information to push back to the mobile computing device via Block S140. In the foregoing examples, Block S140 can pass such data to the computer network over time, such as every ten seconds while the user's mobile computing device is in range of a wireless beacon within a retail store. For example, the computer network can extrapolate a user's route through a store location based on wireless beacon IDs received by the mobile computing device and passed to the DNS over time, and the computer network can predict a subsequent product of interest to the user based on previous estimated product engagement within the store and select a notification to suggest the subsequent product to the user and/or to customize a level of information about the subsequent product to share with the user in a notification.

Alternatively, Block S140 can receive general information from the computer network and implement any of the foregoing methods or techniques to customize notifications for the user internally. For example, Block S140 can receive a notification generator specific to a particular wireless beacon or a group of wireless beacons and input user, beacon, or mobile computing device data, etc. into the notification generator to output a customized notification for the user. However, Block S140 can receive and/or generate a generic or customize micro-location based notification including any one or more of product information, pricing information, product reviews, product pictures, store or retails information, customer service information, in-store guidance, etc. based on an estimated position and/or orientation of the user's mobile computing device relative to one or more wireless beacons.

Block S150 of the method S100 recites presenting the notification to the user on the mobile computing device based on the estimated proximity of the mobile computing device to the wireless beacon. Generally, Block S150 functions to display the notification received in Block S140 for the user. In one example, Block S150 displays the notification as a pop-up notification on the display of the user's mobile computing device. In this example, the pop-up notification can be incomplete or contain only the general information, and Block S150 can direct the user into a related native application to display the remainder of the notification to the user in response to selection of the pop-up notification. Alternatively, Block S150 can display the notification received in Block S140 directly wholly within the native application. Block S150 can additionally or alternatively trigger a vibrator within the mobile computing device to alert the user of the notification, transmit an audible indicator of the notification through a set of headphones or a (Bluetooth) headset connect to the mobile computing device or through a speaker within the mobile computing device, and/or pass the notification through an intelligent personal assistant to verbally communicate details of the notification to the user. However, Block S150 can present the notification to the user in any other textual, verbal, audible, haptic, and/or other format through the mobile computing device and/or a peripheral device connected to the mobile computing device.

In one example implementation, a user approaches an entrance of a retail store location. A native application executing on the user's mobile computing device implements the method S100, and Block S110 retrieves a unique identifier from a first wireless beacon near the entrance of the store location, as shown in FIG. 2. Block S120 determines that the user is moving toward and into the store, Block S130 confirms that the native application executing on the mobile computing device corresponds to the retail store location, and Block S140 communicates with a corresponding DNS and computer network to retrieve relevant notifications. In this example implementation, Block S150 first presents a notification recites, "Hi Jim! Welcome back to Big Box Store." Once the user enters the store, Block S110 retrieves a unique identifier from a second wireless beacon, Block S140 passes the second unique identifier to the DNS and the computer network, and Block S150 presents second notification reciting, "What are you looking for today?" The native application can then prompt the user to enter one or more products or services currently sought. Alternatively, once the user enters the store, Block S140 can retrieve a pre-populated shopping list or wish list saved on the computer network or locally on the user's mobile computing device, and Block S150 can display the second notification that recites "Want to use this shopping list today?" alongside the shopping list. Subsequently, as the user moves through the store and Block S110 and Block S120 receive additional unique identifiers and estimate the user's position relative to various wireless beacons, Block S140 can retrieve navigation directions from the computer network to direct the user to subsequent items on the user's shopping list. Alternatively, Block S140 can download a store map populated with aisle, product, and wireless beacons locations and generate navigational commands accordingly to aid the user in efficiently navigating through the store location.

In the foregoing example implementation, the method S100 can thus enable a micro-location web mapping service to navigate a user through a store location. For example, wireless beacons can be arranged throughout a store location and product within the store can be mapped with relation to one or more wireless beacons. Aisles and other static features within the store location can be similarly mapped with relation to one or more wireless beacons. Thus, Block S120 can estimate the position of a mobile computing device relative to one or more wireless beacons (e.g., down to one-centimeter resolution), and Block S140 can select, receive, or generate product and/or navigational notifications for the user based on the store map that relates position of products, wireless beacons, and static store features. Thus, when product, static store features, and/or beacons are moved within the store location, such as when a product line is changed or when the store location is renovated, the map can be substantially easily updated and implemented without necessitating a map update across mobile computing devices used by the store's customers.

The method S100 can further handle transmission of data from the mobile computing device to one or more wireless beacons. In one implementation, the wireless beacon is outfitted with a low-range and/or low-power wireless communication capability (e.g., Bluetooth Low-Energy), and the mobile computing device thus serves as a gateway to longer-distance communication and/or other types of communication protocol for a wireless beacon. For example, the mobile computing device can be a smartphone with Internet capability, and a native retail application executing on the smartphone can download a software update for a wireless beacon within range and then push an over-air software update to the wireless beacon nearby. Thus, in this example, the mobile computing device can serve as a link to an external computer network to update software on a wireless beacon. If the mobile computing device is moved out of range of the wireless beacon before the over-air update completes, another mobile computing device passing near the wireless beacon at a later time can complete the over-air update.

Additionally or alternatively, wireless beacons within wireless range can communicate with each other. In one example, if a first wireless beacon receives a software update from a nearby mobile computing device, but the mobile computing device remains out of range of a second wireless beacon, the first wireless beacon can transmit the software update to the second wireless beacon. The second wireless beacon can then transmit the software update to a third wireless beacon out of range of both the mobile computing device and the first wireless beacon. Wireless beacons can thus be "daisy-chained" to effectively increase the wireless range of any particular wireless module, a particular mobile computing device, or any other connected wireless device. In another example, a mobile computing device can transmit an over-air software update to a first wireless beacon, but the mobile computing device can move out of range of the first wireless beacon before the update completes. In this example, a second wireless beacon can receive a remaining portion of the update, and the first and second wireless beacons can share stored portions of the update to complete the update on each wireless beacon. In yet another example, wireless beacons can transmit time-dependent mobile computing device proximity and/or a unique wireless ID of the mobile computing device to nearby wireless beacons, such as to track user movement through the store.

One or more mobile computing devices and one or more wireless beacons can thus form a mesh network within a retail storefront, a market, a location, etc. However, the method S100 can function in any other way to present a notification to a user through a mobile computing device in response to communication with one or more wireless beacons nearby.

In one application of the method S100, Blocks of the method S100 function to guide a store representative in out-of-the-box setup of a beacon. For example, once assembled and activated (e.g., powered) a beacon can transmit a corresponding unique identifier in perpetuity (until a battery is depleted). Once shipped and after arriving at a store, a computing device within the store and loaded with a corresponding native retailer application can implement Block S110 to receive the unique identifier from the beacon and then implement Block S130 to confirm that the received beacon ID corresponds to a beacon assigned to and/or shipped to the store. Blocks S140 and S150 can subsequently trigger the computing device to guide the store representative through beacon setup. In this example, the native retailer application executing on the computing device can prompt the store representative to place the beacon in the store and then implement Block S120 to generate or update a map of beacons within the store. The native retailer application can also prompt the store representative to assign a deal, a product, or other information to the beacon or to an area within the store corresponding to an overlap between wireless ranges of two or more beacons. Thus, the method S100 can function to automatically guide a store representative through beacon setup once the beacon arrives at the store location without necessitating 'syncing' between the beacon and another device within the store and without necessitating a manual input into the beacon (e.g., turning the beacon 'ON'). However, the method S100 can function in any other way to support a store representative in beacon setup and management and/or to provide additional product- and/or beacon-related data to a user during a visit to a store.

2. Second Method

Figure 3:
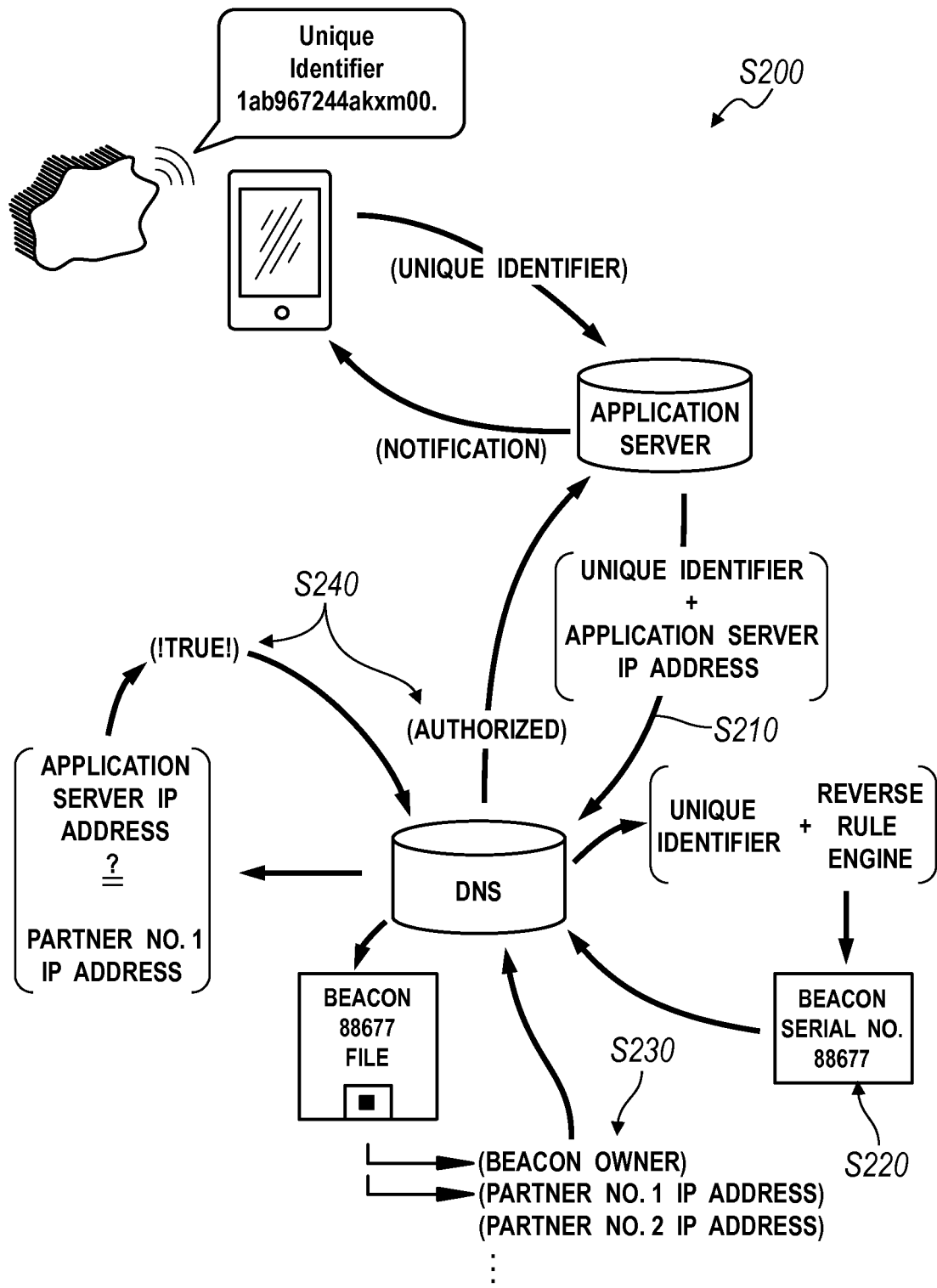
FIG. 3 is a flowchart representation of a second method in accordance with the invention.

As shown in FIG. 3, a method S200 for distributing micro-location-based notifications to a computing device includes: receiving a unique identifier from a first entity in Block S210, the unique identifier collected from a wireless beacon by a computing device proximal the wireless beacon, the unique identifier generated locally on the wireless beacon according to a rule assigned to the wireless beacon; resolving the unique identifier into an identity of the wireless beacon based on the rule in Block S220; identifying a second entity affiliated with the wireless beacon based on the identity of the wireless beacon in Block S230; and in response to agreement between the first entity and the second entity, authorizing delivery of a communication through a native application executing on the computing device responsive to receipt of the unique identifier at the computing device in Block S240, the communication related to the first entity.

Figure 4:
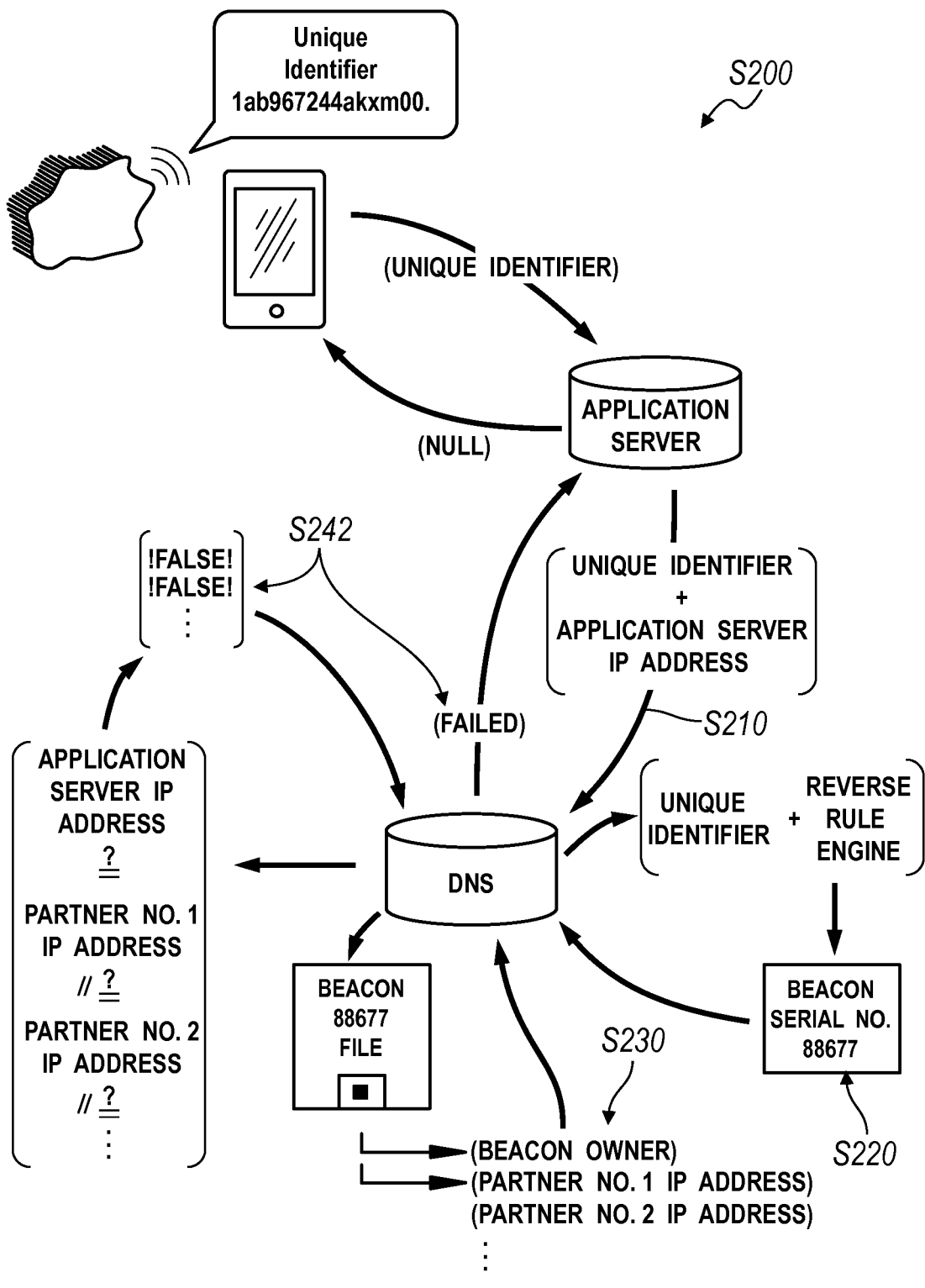
FIG. 4 is a flowchart representation of one variation of the second method.

As shown in FIG. 4, the method S200 can additionally or alternatively include: in response to disagreement between the first entity and the second entity, rejecting delivery of a communication through a native application executing on the computing device responsive to receipt of the unique identifier at the computing device in Block S242, the communication related to the first entity.

As shown in FIG. 3, one variation of the method S200 includes: receiving a unique identifier in Block S210, the unique identifier collected from a wireless beacon by a computing device proximal the wireless beacon, the unique identifier generated locally on the wireless beacon according to a rule assigned to the wireless beacon; resolving the unique identifier into an identity of the wireless beacon based on the rule in Block S220; identifying an entity affiliated with the wireless beacon based on the identity of the wireless beacon in Block S230; receiving a designator of a native application executing on the computing device in Block S210; and in response to agreement between the entity and the designator, authorizing delivery of a communication through the native application executing on the computing device responsive to receipt of the unique identifier at the computing device in Block S240, the communication related to the wireless beacon.

2.1 Applications

The method S200 functions to authorize delivery of a communication from a third-party entity to a user through the user's (mobile) computing device in response to proximity of the computing device to a wireless beacon sufficient to enable wireless communication therebetween. Generally, the method S200 can control a third-party entity's access to messaging the user's computing device directly—responsive to proximity of the computing device to a wireless beacon— based on determined parity between a native application executing on the user's computing device and ownership of (and/or access definitions assigned to) the wireless beacon. In particular, the method S200 can be implemented to enable third-party entities with granted access to the wireless beacon to transmit messages (e.g., notifications) to the user's computing device substantially in real-time when the computing device receives a unique identifier from the wireless beacon, and the method S200 can be implemented to prevent other third-parties not previously granted access to the wireless beacon to deliver communications related to the wireless beacon to the user's computing device when the computing device comes within wireless range of the wireless beacon.

In one example, a first commercial airline acquires various wireless beacons and arranges the wireless beacons around gates of a terminal hosting commercial flights served by the first commercial airline, and the wireless beacons are each assigned a serial number and noted in a database as belonging to the first commercial airline. In this example, a first customer of the first commercial airline can download a first native application related to (e.g., hosted by, served by) the first commercial airline to his smartphone (or tablet, i.e., "computing device"), and the first commercial airline can serve notifications—related to the first commercial airline— to the first customer through the first native application in response to receipt of a wireless identifier from the wireless beacon (i.e., when the smartphone or tablet comes within wireless range of the wireless beacon). In particular, the first native application can receive the unique identifier from the wireless beacon and upload the unique identifier to a first application server hosted by the first commercial airline; the first application server can pass the unique identifier to a domain name system ("DNS") (e.g., in Block S210) to identify the corresponding wireless beacon and to confirm that the wireless beacon is owned by the first commercial airline hosting the first native application (e.g., in Blocks S220 and S230); and the first application server can upload a timely notification to the first customer's smartphone for (substantially) immediate presentation to the first customer in response to confirmation of ownership of the wireless beacon by the related first commercial airline (e.g., in Block S240).

However, in this example, a second customer can install a second native application—related to (e.g., hosted by, served by) a second commercial airline—on his smartphone, and the second native application can handle a unique identifier received from the wireless beacon by uploading the unique identifier to a second application server hosted by the second commercial airline; the second application server can pass the unique identifier to the DNS (e.g., in Block S210); and the DNS can identify the corresponding wireless beacon, detect a disagreement between ownership of the wireless beacon and the second commercial airline hosting the second native application (e.g., in Blocks S220 and S230), and reject communication from the second commercial airline responsive to receipt of the unique identifier from the wireless beacon based on the disagreement (e.g., in Block S242).

Therefore, the method S200 can be executed to restrict (e.g., prevent) communications from the second commercial airline in response to proximity of a customer to a wireless beacon owned by the first commercial airline. In particular, the method S200 can be executed to prevent a competitor of a first entity from delivering notification to a customer of the first entity responsive to proximity of the customer to a wireless beacon owned by the first entity. For example, the method S200 can be executed on behalf of the first commercial airline to selectively share wireless beacon data and/or authorize wireless-beacon-related communications according to permissions assigned specifically to the wireless beacon, thereby preventing the second commercial airline from communicating an offer—for a flight competing with a flight offering of the first commercial airline—to the second customer's smartphone as the second customer walks passed the wireless beacon owned and operated by the first commercial airline.

The method S200 can also execute to selectively authorize notifications from secondary third-party entities (e.g., parties outside of the computing device, the DNS, and the entity in possession of the wireless beacon) to a computing device responsive to proximity of the computing device to the wireless beacon. As in the foregoing example, the method S200 can execute to enable an airport authority, the airport terminal, or other entity authorized by the first commercial airline to transmit communications to the first customer responsive to receipt of a unique identifier from the wireless beacon owned by the first commercial airline.

The method S200 can additionally or alternatively function to confirm access—by the user through his computing device—to data associated with the wireless beacon, as in method S200 described above. For example, a user can walk into a retail location with his computing device (e.g., smartphone, tablet), the computing device can download a unique identifier from a wireless beacon arranged within the retail location once the computing device is within wireless range of the wireless beacon; a remote server (e.g., a DNS, an application server) can then upload the unique identifier (e.g., in Block S210), identify the unique identifier as corresponding to the wireless beacon owned and operated by the retail location (e.g., in Block S220 and Block S230), determine if a native application related to the retail location is installed on the user's computing device (e.g., in Block S210), and enable communication of product- and/or retailer-related information to the user through the computing device if the native application is installed on the user's computing device (e.g., in Block S240). The method S200 can therefore be implemented to enable substantially real-time notifications to a user through a branded native application executing on the user's native application, the notifications related to a retailer, service provider, etc. currently occupied or engaged by the user.

The method S200 can be executed by a computer system remote from the user's computing device, such as by a DNS hosted on a remote server and distinct from an entity in possession of the wireless beacon, or such as by an application server hosted on a remote server on behalf of the entity in possession of the wireless beacon. The computer system can be cloud-based (e.g., Amazon EC2), a mainframe computer system, a grid-computer system, or any other suitable computer system. Blocks of the method S200 can additionally or alternatively execute locally on a user's computing device, such as on a native application executing on the user's smartphone, tablet, a personal music player, a personal data assistant (PDA), or other mobile computing device. For example, Blocks of the method S200 can be implemented by a handheld (e.g., mobile) computing device, such a smartphone, a digital music player, or a tablet computer executing a native retailer- or service provider-branded application handling real-time delivery of communications to a user responsive to receipt of unique identifiers from local wireless beacons.

2.2 Unique Identifier

Block S210 of the method S200 recites receiving a unique identifier from a first entity, the unique identifier collected from a wireless beacon by a computing device proximal the wireless beacon, the unique identifier generated locally on the wireless beacon according to a rule assigned to the wireless beacon. Block S210 can similarly recite receiving a unique identifier collected from a wireless beacon by a computing device proximal the wireless beacon, the unique identifier generated locally on the wireless beacon according to a rule assigned to the wireless beacon. Generally, Block S210 functions to collect a unique identifier transmitted wirelessly from a wireless beacon to a computing device (e.g., a mobile computing device, such as a smartphone, a tablet, a personal music player, a PDA, etc.).

Figure 5A:
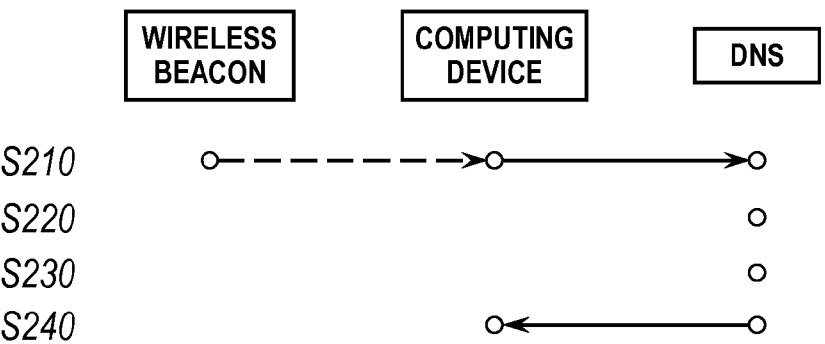
FIGS. 5A, 5B, and 5C are flowchart representations in accordance with variations of the second method.
Figure 5B:
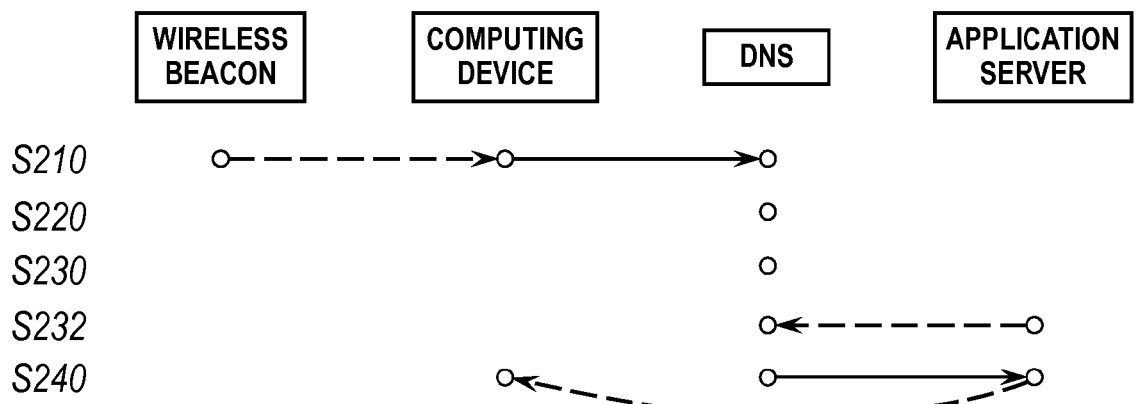

In one implementation in which Block S210 is executed remotely from the computing device, the computing device can cyclically broadcast a request for a unique identifier, such by transmitting a request over Bluetooth communication protocol on a two-second interval. Once a wireless beacon comes within wireless range of the computing device, the computing device can download a unique identifier from the wireless beacon and then upload the unique identifier directly to a DNS that converts the unique identifier into an identity (e.g., a serial number) of the wireless beacon. The DNS can then communicate directly with a native application related to the wireless beacon and executing on the user's computing device to deliver a related communication to the user, as shown in FIG. 5A. Alternatively, the DNS can communicate directly with a particular application server related to the wireless beacon (affiliated with an entity in possession of the wireless beacon or in possession of access to the wireless beacon) to confer authorization to communicate a notification related to the wireless beacon to the user's computing device, as shown in FIG. 5B.

Figure 5C:
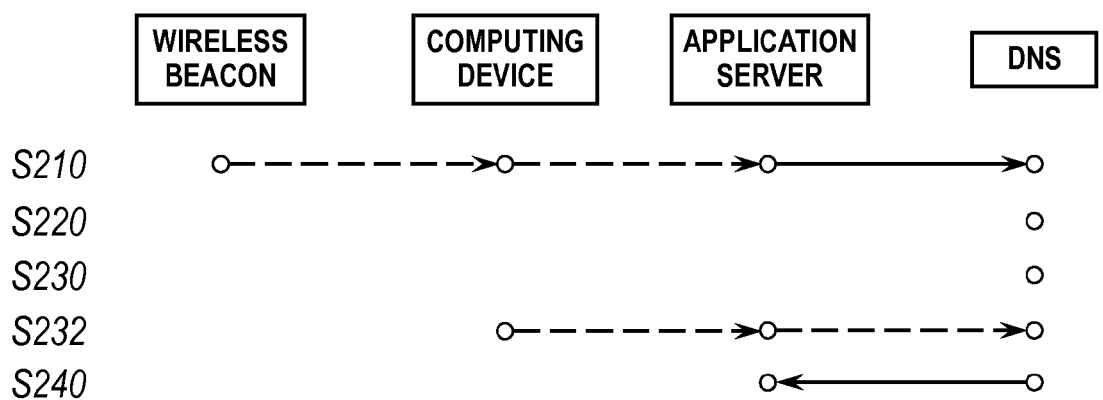

In a similar implementation, once a wireless beacon comes within wireless range of the computing device, the computing device can download the unique identifier from the wireless beacon, and a native application executing on the computing device and supporting communications with wireless beacons can then upload the unique identifier to an application server related to (e.g., hosting) the native application. The application can then pass the unique identifier to a DNS that converts the unique identifier into an identity of the wireless beacon (e.g., in Block S210), confirms access to the wireless beacon by the native application (in Block S240), and transmits—to the application server—authorization for native application to communication wireless beacon-related information to the user, as shown in FIG. 5C. Alternatively, application server can execute a domain name system internally to execute Blocks S220, S230, and/or S240, etc. locally, and the application server can thus communicate directly with the computing device to deliver messages to the user responsive to communications between the wireless beacon and the user's computing device.

In yet another implementation, a native application, a system-level process, or other program executing on the computing device performs Blocks S210, S220, and/or S230, etc. locally to collect a unique identifier from the wireless beacon, to resolve the unique identifier into an identity of the wireless beacon, and/or to ascertain permission to deliver communications to the user responsive to receipt of the unique identifier from the wireless beacon, etc.

The first entity from which the unique identifier is received in Block S210 can therefore include the wireless beacon, a native application or other program or process executing on the computing device, or an application server related to a native application or other program executing on the computing device. However, the unique identifier can be collected in any other way, and the unique identifier can be routed—in Block S210—from the wireless beacon to any other local or remote application, program, process, server, and/or system for resolution into an identity of the wireless beacon according to any other schema or schedule.

Block S210 can further recite receiving a designator of a native application executing on the computing device. In particular, Block S210 can append a designator for the first entity—from which or through which the unique identifier of the wireless beacon is collected—to the unique identifier or group the designator for the first entity with the unique identifier. For example, a native application executing on the user's computing device can broadcast a unique identifier request when the location of the computing device is within a threshold (GPS) location of a known location of a wireless beacon, download a unique identifier from a local wireless beacon, and upload the unique identifier to a remote server; Block S210, executing on the remote server (e.g., on an application server, on a DNS) can collect the unique identifier and a designator identifying the native application, a version of the native application, an entity hosting or affiliated with the native application, and/or a software developer of the native application. In this example, Block S240 can thus selectively authorize communications related to the wireless beacon through the native application based on agreement between the native application (the first entity, as determined from the designator) and an owner and/or operator of the wireless beacon (the second entity). In a similar example, a system-level process executing on the computing device can prompt and receive the unique identifier from the wireless beacon, and Block S210 can retrieve the unique identifier in conjunction with a list of designators for native applications installed on the computing device and configured to deliver notifications to the user responsive to communications with local wireless beacons. In this example, Block S240 can thus selectively authorize communications related to the wireless beacon through the computing device based on agreement between a native application (the first entity) on the list of native applications and an owner of the wireless beacon (the second entity). In yet another example, Block S210 can collect the unique identifier from an application server, and Block S210 can pair the unique identifier with a designator of the application server, such as a software developer name or number. In this example, Block S240 can thus selectively authorize communications related to the wireless beacon through a native application supported by the application server based on agreement between the application server designator (the first entity) and an owner of the wireless beacon (the second entity).

Block S220 of the method S200 recites resolving the unique identifier into an identity of the wireless beacon based on the rule in Block S220. Generally, Block S220 functions to identify the wireless beacon from the unique identifier received in Block S210. For example, Block S220 can translate the unique identifier into a unique serial number assigned to the wireless beacon. In another example, Block S220 can translate the unique identifier into a pointer to a local or remote file or database specific to the wireless beacon. Alternatively, Block S220 can translate the unique identifier into an identity, serial number pointer, address, etc. of a manufacturing batch number, a deployment group number, an owner, a lessee, and/or a deployment location, etc. of or related to the wireless beacon. However, Block S220 can resolve the unique identifier received in Block S210 into any other useful or relevant data pertaining to the wireless beacon.

The wireless beacon can store locally and (intermittently) recall a rule to locally generate a unique identifier that is not immediately resolvable into a useful value without access to the rule, and the wireless beacon can then publically broadcast this unique identifier for collection by any local computing device. For example, the wireless beacon can broadcast a universally unique identifier ("UUID"), such as including a string of characters (e.g., a 128-bt hexadecimal number) in which the string of characters is practically unique (i.e., not guaranteed unique). The wireless beacon can also pass its own serial number (stored locally in memory), a unique identifier request counter value, an interval counter value, a time of day, a date, and/or any other static value or variable value into the rule to generate the unique identifier that is practically unique among substantially all other unique identifiers broadcast from all other deployed wireless beacons over time.

In one example, the rule for generating the unique identifier can be encoded onto the wireless beacon during its manufacture, upon purchase by an entity (e.g., the second entity), or upon deployment of the wireless beacon into a space, etc. The wireless beacon can then implement the rule to generate new unique identifiers over time during its deployment. For example, the wireless beacon can: index a request counter in response to receipt of a new request for a unique identifier received from a local computing device; apply the state of the request counter and an internal serial number to the rule to generate a new unique identifier responsive to the request; and broadcast the unique identifier with the state of the request counter for collection by the computing device accordingly. In this example, Block S210 (executed locally on the computing device or remotely) can then pass the request counter value and the unique identifier into a reverse rule engine (to which access is limited, such as only to a privately-controlled DNS) to resolve the unique identifier into the serial number of the wireless beacon.

Alternatively, the wireless beacon can systematically generate a new unique identifier for each subsequent time interval during its deployment, such as by generating a new unique identifier every five minutes during its deployment. For example, the wireless beacon can: maintain an internal interval counter and index the interval counter forward every minutes; apply the new interval counter value to generate a new unique identifier for the current time interval; and publically broadcast this new unique identifier for collection by a local computing device. As in the previous example, Block S210 can pass the interval counter value and the unique identifier into a reverse rule engine to resolve the unique identifier into a serial number of the wireless beacon.

However, the wireless beacon can apply a time of day corresponding to generation of the unique identifier (a "time code"), a date of generation of the unique identifier (a "date code"), a time or date of receipt of the unique identifier at the computing device, and/or any other trackable variable to the rule to generate the unique identifier, and Block S220 can extract this variable from a data packet—including the unique identifier—received from the wireless beacon to resolve the unique identifier into an identity of the wireless beacon.

Block S220 can therefore access a rule (or a reverse rule engine) related to that encoded into or stored on the wireless beacon to transform the unique identifier broadcast from the wireless beacon into useful information pertaining to the wireless beacon. For example, substantially all deployed wireless beacons can be encoded with the same rule that outputs a unique identifier based on a serial number, a counter value, and any other static or dynamic variable value stored locally on a wireless beacon. Block S220 can thus resolve the unique identifier by accessing a private copy of the rule (or a reverse rule engine) and applying a received counter value and/or an other variable value to the private copy of the rule to output the identity of the wireless beacon. Similarly, one of a variety of distinct rules can be encoded into each deployed wireless beacon, and Block S220 can test the unique identifier received in Block S210 against a copy of each distinct rule until a valid wireless beacon identity value is output. Yet alternatively, Block S220 can extract a value from the received unique identifier, correlate this value with a particular rule encoded onto the wireless beacon, and apply the (remainder of) the unique identifier to a copy of the particular rule to determine an identity of the wireless beacon (or an identity of the second entity, an identity of an other entity affiliated with the wireless beacon, a location of the wireless beacon, and/or a pointer or address for the wireless beacon, etc.).

Block S220 can therefore be executed locally on the computing device, remotely on an application server, and/or remotely on a server implementing a DNS and/or in cooperation with a local or remote database of wireless beacon data, private wireless beacon rules, etc. However, Block S220 can function in any other way to resolve an identity of the wireless beacon from the unique identifier according to any other schema.

2.3 Entity Affiliated with Wireless Beacon

Block S230 of the method S200 recites identifying a second entity affiliated with the wireless beacon based on the identity of the wireless beacon. Generally, Block S230 functions to identify one or more entities granted permission to deliver beacon-related communications to a computing device responsive to communication between the computing device and the wireless beacon.

In one implementation, Block S230 passes a serial number of the wireless beacon—resolved from the unique identifier in Block S220—into a database specifying wireless beacon ownership by serial number to identify a particular entity (i.e., the second entity) in possession of the wireless beacon. For example, a lookup table can be updated with a serial number of the wireless beacon and an identity of the entity (e.g., a customer number, a customer name) when the wireless beacon is sold to (or shipped to, etc.) the entity. In another example, a file specific to the wireless beacon can be generated when the wireless beacon is manufactured, the file initially specifying a serial number and a configuration of the wireless beacon, and the file can be updated with ownership information when the sold wireless beacon is sold (or shipped to, etc.) the entity. In this example, the file can be linked to a pointer specific to the wireless beacon, Block S220 can resolve the unique identifier received in Block S210 into a pointer, and Block S230 can access ownership information for the wireless beacon by retrieving the file via the resolved pointer.

Block S230 can therefore manipulate the identity of the wireless beacon determined in Block S220 to identify a primary entity possessing ownership of the wireless beacon, such as: a toy store, a clothing store, a car dealership, or other retail location; an airport, airport terminal, airport terminal gate, a public bus system, a train or rail system, or other service provider; or a school, a park, a restaurant, a coffee shop, an office, a museum, or any other type entity occupying or affiliated with any other type space.

Block S230 can additionally or alternatively manipulate the identity of the wireless beacon to identify a particular space occupied by the wireless beacon. For example, the database or file containing wireless beacon identity data can specify a GPS location, address, room number, and/or room or location code, etc. in which the wireless beacon is installed. Block S230 can therefore determine the (second) entity that includes or is related to a particular physical space.

Block 230 can further identify a particular product or service affiliated with the wireless beacon based on the identity of the wireless beacon. For example, the wireless beacon can be installed on or otherwise coupled to a particular product within a retail environment or showroom; an operator of the wireless beacon can update a file specific to the wireless beacon with a serial number, SKU number, a manufacturer name or number, and/or a model name or number, etc. of the corresponding product; and Block S230 can retrieve any one or more of the foregoing product-related data from the wireless beacon file (shown in FIGS. 3 and 4) based on the identifier of the wireless beacon to identify the product.

Block S230 can also identify one or more other parties authorized to communicate notifications through a computing device through the wireless beacon (i.e., response to communication between the wireless beacon and the computing device). In particular, Block S230 can access a database, beacon file, or other data repository enumerating parties authorized to deliver communications through the native application responsive to data transfer between the wireless beacon and the computing device. The database or other repository can include a static or updateable list of parties provided such access to the wireless beacon, such as set and controlled by the owner and/or operator of the wireless beacon (i.e., the second entity). For example, an owner or operator of the wireless beacon can update a file specific to the wireless beacon with a name, number, IP address, application server address, customer number, and/or real location, etc. of each company, individual, native application, etc. authorized to communicate with local users through the wireless beacon, and Block S230 can retrieve these data from the beacon file to identify secondary third-party entities granted access to the wireless beacon.

In the example above in which the wireless beacon is owned by a commercial airline operating in a series of gates in a terminal of a commercial airport, the beacon file can indicate that a terminal operator in the commercial airline's terminal and an airport operator for the commercial airport are both authorized to communicate with local users responsive to communications between the users' computing devices and the wireless beacons, such as in the event of a terminal or airport emergency, a security alert, an airport or terminal shutdown, a runway closure, etc. In another example, the wireless beacon is owned and operated by a local retail location that sells products from a variety of vendors; is arranged in the retail location on or near a product supplied by a particular vendor; and is associated with a beacon file indicating that the particular vendor is authorized to deliver notifications to a customer's computing device responsive to communication between the computing device and the wireless beacon. In this example, Block S230 can access the beacon file to determine that the particular vendor has been granted permission to communication through the wireless beacon, and Block S240 can match a designator of a native application executing on a customer's computing device—as received in Block S210—to the particular vendor. In response to the positive match between the native application and the particular vendor, Block S240 can authorize the particular vendor to communicate with the customer through the affiliated native application responsive to communication between the customer's computing device and the wireless beacon owned and operated by the retail location distinct from the particular vendor. Therefore, Block S230 can identify a retail location affiliated with the wireless beacon based on the identity of the wireless beacon, and Block S240 can authorize delivery of a notification related to a product in inventory at the retail location, through the native application, in response to identification of an affiliation between the retail location and the native application executing on the computing device. For example, Block S240 can authorize delivery of a notification specifying a limited discount price of the product for a user associated with the computing device, as described above.

However, a list of designators of secondary third-party entities entitled to access the particular wireless beacon (or a group of local wireless beacons) can be populated in a table, beacon file, database, or any other repository, and Block S230 can access this repository in any other way to identify one or more entities (including or other than an owner/operator of the wireless beacon) authorized to communicate with a user through the wireless beacon.

2.4 Communication Authorization

Block S240 of the method S200 recites, in response to agreement between the first entity and the second entity, authorizing delivery of a communication through a native application executing on the computing device responsive to receipt of the unique identifier at the computing device in Block S240, the communication related to the first entity. Block S240 can similarly recite, in response to agreement between the entity and the designator, authorizing delivery of a communication through the native application executing on the computing device responsive to receipt of the unique identifier at the computing device in Block S240, the communication related to the wireless beacon. Generally, Block S240 functions to confirm parity between the first entity and the second entity before authorizing the first party to communicate with the user through the wireless beacon. In particular, given suitable parity between the first entity and the second entity, Block S240 selectively authorizes the second entity (e.g., a native application, an application server) to deliver a notification to the user through the user's computing device substantially in real-time after the computing device receives a unique identifier from the wireless beacon.

In one implementation, Block S240 matches a native application executing on the user's computing device directly to ownership of the wireless beacon and authorizes the notification to serve a timely, location-specific notification to the user's computing device substantially in real-time responsive to receipt of the unique identifier from the wireless beacon to the computing device. For example, the user's computing device can collect a unique identifier from a wireless beacon arranged proximal a gate operated by a first commercial airline at a commercial airport, a native application executing on the computing device can upload the unique identifier to a corresponding application server, and the application server can pass the unique identifier and an IP address, proxy address, or other identifier of the application server to a DNS executing the method S200, as shown in FIG. 3. Block S230—executing on the DNS—can identify the first commercial airline as an owner and operator of the wireless beacon based on a serial number of the wireless beacon extracted from the unique identifier in Block 220; and Block S240 can match the IP address, the proxy address, or the other identifier of the application server to the first commercial airline and confer authorization for the applications server to serve a notification to the user through the native application executing on the computing device accordingly. In this example, the first commercial airline can thus own the wireless beacon, install the wireless beacon near a gate in which the commercial airline operates, serve a branded native application for installation on customer devices (e.g., smartphones), the branded native application hosted on an application server on behalf of the first commercial airline; the method S200 can thus enable the first commercial airline to deliver notifications to its customers through its own branded native application responsive to communication between its customers' smartphones and its wireless beacons. Block S240 can therefore authorize delivery of a notification from the first entity (e.g., the application server) to the computing device in response to a direct match between the first entity and the second entity (e.g., the owner/operator of the wireless beacon).

In a similar example, the method S200 can interface directly with the instance of the native application executing on the user's computing device to confirm presentation of a beacon-related notification to the user. In this example, Block S210 can receive the unique identifier and an address or other identifier of the native application directly from the computing device, and Block S240 can match the identifier of the native application directly to an address or other identifier of the owner/operator of the wireless beacon. Block S240 can supply authorization to communicate a beacon-related notification directly to the native application given a positive match. Block S240 can therefore search for a direct match between the second entity and a designator of the native application executing on the user's computing device, the application server, etc. Block S240 can access a table, file, database, or other data repository containing (IP) addresses, proxies, or any other designator or identifier of the first and second entities to search for such a match.

In another implementation, Block S240 searches for a match between the second entity (e.g., an owner, an operator, a lender, and/or a lessee of the wireless beacon) and the first entity not immediately or directly affiliated with the wireless beacon. For example, Block S240 can select a database of authorized parties specific to the wireless beacon and set by the owner of the wireless beacon; parse through the database for a match to the designator of the first entity received in Block S210; and then transmit—to the party or to an affiliate of the party (e.g., an application server hosting a native application developed by the party)—authorization for the communication to the user's computing device. Block S240 can therefore authorize delivery of a notification from the first entity (e.g., the application server) to the computing device in response to identification of the first entity in the database of parties authorized to communicate through the wireless beacon.

In one implementation in which an application server hosting the native application executing on the user's computing device also executes the method S200, Block S240 can further include transmitting a notification to the computing device in response to a match between the first entity and the second entity, the notification related to the first entity and designated for visual presentation on the computing device. For example, Block S240 can elect a current notification specific to the wireless beacon, current notification corresponding to a local cluster of wireless beacons owned by the second entity (or authorized to the first entity), or a current notification generic to substantially all wireless beacons owned by the second entity (or authorized to the first entity), and Block S240 can thus trigger delivery of the elected notification to the computing device, such as over cellular communication protocol. Block S240 can also set the notification for immediate or delayed presentation on the computing device or add the notification to a queue of notifications for visual presentation to the user via the computing device. Alternatively, Block S240 can assign a maximum threshold distance between the computing device and the wireless beacon to trigger visual presentation of the notification on the computing device. The native application (or other process) executing on the computing device can then estimate a distance between the wireless beacon and the computing device, such as based on a time of flight technique as described above, and the native application can present the notification when the threshold maximum distance is reached.

Block S240 can additionally or alternatively authorize transmission of a communication—related to a position of the wireless beacon within a space affiliated with the first entity—to the computing device. For example, Block S210 can further include receiving a second unique identifier, the second unique identifier collected from a second wireless beacon by the computing device proximal the second wireless beacon, the second unique identifier generated locally on the second wireless beacon according to the rule. Block S210 can also include receiving a first wireless signal strength value of the (first) wireless beacon and receiving a second wireless signal strength value of the second wireless beacon. In this example, Block S240 can then prioritize authorization of delivery of the communication related to the wireless beacon over authorization of delivery of a second communication related to the second wireless beacon according to the first wireless signal strength value that exceeds the second wireless signal strength value.

However, Block S240 can match the first entity and the second entity according to any other accessible beacon-related data and in any other suitable way, and Block S240 can function in any other way to authorize and/or trigger delivery of any other type of communication to the user through the user's computing device.

As shown in FIG. 4, one variation of the method S200 includes Block S242, which recites, in response to disagreement between the first entity and the second entity, rejecting delivery of a communication through a native application executing on the computing device responsive to receipt of the unique identifier at the computing device in Block S242, the communication related to (e.g., sources from, branded for) the first entity. Generally, Block S242 functions to block or otherwise inhibit delivery of a communication—related to the wireless beacon—to the user's computing device responsive to communication between the computing device and the wireless beacon if the first entity does not sufficiently meet agreement criteria specified for the wireless beacon. Therefore, Block S242 can execute if Block S240 returns a negative or false value. For example, based on the second entity, Block S242 can select a database of parties authorized to deliver communications through the native application responsive to data transfer between the wireless beacon and the computing device, and Block S242 can then transmit a communication rejection for the communication (e.g., to the application server or directly to the computing device) in response to omission of the first entity from the database of parties. However, Block S242 can function in any other way to reject delivery of a communication to the user through the computing device in response to disagreement between the first entity and the second entity.

2.5 Variations

In one example application, the method S200 executes locally on the computing device. In this example application, Block S210 includes downloading the unique identifier from the wireless beacon in response to a wireless signal from the wireless beacon exceeding a threshold wireless signal; and Block S220 includes resolving the unique identifier into the identity of the wireless beacon locally based on the rule stored on the computing device. In this example application, Block S222 can include detecting the native application installed on the computing device and related to the entity; and Block S240 can include, in response to detecting the native application installed on the computing device and related to the entity, queuing a notification for presentation on the computing device responsive to receipt of the unique identifier from wireless beacon. For example, Block S240 can include downloading the notification from a remote database to the computing device, the remote database containing a set of notifications affiliated with the entity and the wireless beacon.

In the foregoing example implementation, the method S200 can further estimating the proximity of the computing device to the wireless beacon; and displaying the notification on the computing device based on the proximity of the computing device to the wireless beacon. Thus, the computing device can render (a form of) the notification on a display of the computing device when the user is within a threshold distance from the wireless beacon. For example, the computing device can render the notification for review by the user substantially in real-time once the computing device comes into wireless range of the wireless beacon, the computing device receiving the unique identifier substantially immediately once within wireless range of the wireless beacon. Alternatively, the computing device can execute Block S210 to collect the unique identifier from the wireless beacon once the computing device is within wireless range of the wireless beacon, Block S240 can download and queue the notification for presentation to the user once the computing device is within a threshold distance of the wireless beacon less than the distance corresponding to the maximum wireless range, and the computing device can render the notification on a display of the computing device once the wireless beacon is detected within the threshold range of the computing device, such as described above.

In another variation of the method, Block S240 includes transmitting a door open request to a door controller controlling an automated door arranged at an entrance to a physical space in response to agreement between the first entity and the second entity, the first entity affiliated with the native application, and the second entity affiliated with the physical space. Generally, in this variation, the method can function to control access to a physical space, such as a retail store or showroom, by enabling only user's with a native application related to the physical space to enter there into. For example, the method can trigger an automatic door (e.g., an electric sliding door) at an entrance to a store to open to a user outside the store only when: 1) the user's computing device is near enough to the entrance of the store to receive a unique identifier from a wireless beacon arranged at the entrance (as in Block S210); and 2) a native application related to the store is installed on the user's computing device. If the user's computing device is not loaded with the correct native application, the method can prompt the user to download the native application in order to gain access to the store. Once installation of the native application on the computing device is confirmed, the Block S240 can deliver (or authenticate delivery of) an access granted communication through the native application to thus prompt the user to enter the store. Once the user thus enters the store, the method can then deliver product- and store-related information to the user through the native application, such as based on further communications between the user's computing device and other wireless beacons arranged within the store. The method can also trigger (or transmit to the computing device a prompt to trigger) the native application to open on the user's computing device such that notifications and/or other communications related to the store can be delivered to the user through the native application (which can be branded for the store, for products, and/or for services available within the store). In this variation, Blocks of the method can execute locally on the user's (mobile) computing device, on a door controller within the physical space, on a local remote server within the physical space, or remotely, such as on an application server or DNS server that communicates (e.g., over and Internet or cellular network) with the user's computing device and/or with a door access controller within the physical space.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for distributing micro-location-based notifications to a computing device, comprising:
   receiving a unique identifier from a first entity, the unique identifier collected from a wireless beacon by a computing device proximal the wireless beacon, the unique identifier generated locally on the wireless beacon according to a rule assigned to the wireless beacon;
   resolving the unique identifier into an identity of the wireless beacon based on the rule;
   identifying a second entity affiliated with the wireless beacon based on the identity of the wireless beacon; and
   in response to agreement between the first entity and the second entity, authorizing delivery of a communication through a native application executing on the computing device responsive to receipt of the unique identifier at the computing device, the communication affiliated with the first entity.

2. The method of claim 1, wherein authorizing delivery of the communication through the native application comprises authorizing transmission of the communication, related to a position of the wireless beacon within a space affiliated with the first entity, to the computing device.

3. The method of claim 1, wherein authorizing delivery of the communication through the native application comprises: selecting a database of parties authorized to deliver communications through the native application responsive to data transfer between the wireless beacon and the computing device, the database of parties specified by the second entity; authorizing delivery of the communication from the first entity to the computing device in response to identification of the first entity in the database of parties.

4. The method of claim 1, further comprising, in response to disagreement between the first entity and the second entity, rejecting delivery of a communication through the native application executing on the computing device.

5. The method of claim 1, further comprising:
receiving a second unique identifier, the second unique identifier collected from a second wireless beacon by the computing device proximal the second wireless beacon, the second unique identifier generated locally on the second wireless beacon according to the rule;
receiving a first wireless signal strength value of the wireless beacon;
receiving a second wireless signal strength value of the second wireless beacon; and
prioritizing authorization of delivery of the communication affiliated with the wireless beacon over authorization of delivery of a second communication affiliated with the second wireless beacon according to the first wireless signal strength value that exceeds the second wireless signal strength value.

6. The method of claim 1, wherein identifying the second entity affiliated with the wireless beacon comprises confirming ownership of the wireless beacon by the entity based on the identity of the wireless beacon; and wherein authorizing delivery of the communication through the native application comprises transmitting a notification to the computing device in response to a match between the first entity and the second entity, the notification related to the first entity and designated for visual presentation on the computing device.

7. The method of claim 1, further comprising transmitting a door open request to a door controller controlling an automated door arranged at an entrance to a physical space in response to agreement between the first entity and the second entity, the first entity affiliated with the native application, and the second entity affiliated with the physical space, wherein authorizing delivery of the communication through the native application comprises authorizing delivery of an access granted communication through the native application.

8. The method of claim 6, wherein transmitting the notification to the computing device comprises generating the notification and specifying delivery of the notification through the native application executing on the computing device responsive to proximity of the computing device to the wireless beacon falling within a threshold distance.

9. A method for distributing micro-location-based notifications to a computing device, comprising:
receiving a unique identifier, the unique identifier collected from a wireless beacon by a computing device proximal the wireless beacon, the unique identifier generated locally on the wireless beacon according to a rule assigned to the wireless beacon;
resolving the unique identifier into an identity of the wireless beacon based on the rule;
identifying an entity affiliated with the wireless beacon based on the identity of the wireless beacon;
receiving a designator of a native application executing on the computing device; and
in response to agreement between the entity and the designator, authorizing delivery of a communication through the native application executing on the computing device responsive to receipt of the unique identifier at the computing device, the communication affiliated with the wireless beacon.

10. The method of claim 9, wherein receiving the unique identifier comprises receiving the unique identifier from an application server, the unique identifier routed from the wireless beacon to the computing device to the application server, the application server affiliated with the native application; wherein receiving the designator of the native application comprises receiving the designator from the application server; and wherein authorizing delivery of the communication through the native application comprises transmitting an authorization confirmation for the communication to the application server.

11. The method of claim 9, wherein receiving the unique identifier comprises receiving the unique identifier and a time code indicating to a local time interval on the computing device correspond to the unique identifier; and wherein resolving the unique identifier into the identity of the wireless beacon comprises translating the unique identifier into the identity of the wireless beacon based on the time code.

12. The method of claim 9, wherein resolving the unique identifier into the identity of the wireless beacon comprises, remotely from the computing device, translating a series of symbols generated at the wireless beacon into a serial number of the wireless beacon based on the rule; and wherein identifying the entity affiliated with the wireless beacon comprises passing the serial number of the wireless beacon into a database of wireless beacon serial numbers to identify the entity in possession of wireless beacon.

13. The method of claim 9:
wherein receiving the unique identifier comprises downloading the unique identifier from the wireless beacon in response to a wireless signal from the wireless beacon exceeding a threshold wireless signal;
wherein resolving the unique identifier into the identity of the wireless beacon comprises resolving the unique identifier into the identity of the wireless beacon locally based on the rule and a time of receipt of the unique identifier from wireless beacon;
wherein receiving the designator of the native application comprises detecting the native application installed on the computing device and related to the entity; and
wherein authorizing delivery of the communication through the native application comprises, in response to detecting the native application installed on the computing device and related to the entity, queuing a notification for presentation on the computing device responsive to receipt of the unique identifier from wireless beacon.

14. The method of claim 9, wherein identifying the entity affiliated with the wireless beacon comprises identifying a product affiliated with the wireless beacon based on the identity of the wireless beacon, the product sold by a retailer; wherein receiving the designator of the native application comprises identifying an affiliation between the native application executing on the computing device and the retailer; and wherein authorizing delivery of the communication through the native application comprises authorizing delivery of a notification related to the product through the native application.

15. The method of claim 9, wherein identifying the entity affiliated with the wireless beacon comprises identifying a retail location affiliated with the wireless beacon based on the identity of the wireless beacon; and wherein authorizing delivery of the communication through the native application comprises authorizing delivery of a notification related to a product in inventory at the retail location, through the native application, in response to identification of an affiliation between the retail location and the native application executing on the computing device.

16. The method of claim 12, wherein authorizing delivery of the communication through the native application comprises: based on the entity, selecting a database of parties authorized to deliver communications through the native application responsive to data transfer between the wireless beacon and the computing device; based on the designator, identifying a party, in the database of parties, associated with the native application; and transmitting, to the party, an authorization for the communication to the computing device.

17. The method of claim 13, wherein queuing the notification for presentation on the computing device comprises downloading the notification from a remote database to the computing device, the remote database containing a set of notifications affiliated with the entity and the wireless beacon.

18. The method of claim 13, further comprising: estimating a proximity of the computing device to the wireless beacon; and displaying the notification on the computing device based on the proximity of the computing device to the wireless beacon.

19. The method of claim 14, authorizing delivery of a notification comprises authorizing delivery of the notification specifying a limited discount price of the product for a user associated with the computing device.

20. The method of claim 15, further comprising receiving an estimated distance between the computing device and the wireless beacon with the retail location, wherein authorizing delivery of the notification related to the product in inventory at the retail location comprises selecting the product for advertisement to the user based on the estimated distance between the computing device and the wireless beacon.

21. A method for distributing micro-location-based notifications to a computing device, comprising:
receiving a unique identifier from a first entity, the unique identifier collected from a wireless beacon by a computing device proximal the wireless beacon, the unique identifier generated locally on the wireless beacon according to a rule assigned to the wireless beacon;
resolving the unique identifier into an identity of the wireless beacon based on the rule;
identifying a second entity affiliated with the wireless beacon based on the identity of the wireless beacon; and
in response to disagreement between the first entity and the second entity, rejecting delivery of a communication through a native application executing on the computing device responsive to receipt of the unique identifier at the computing device, the communication affiliated with the first entity.

22. The method of claim 21, in response to agreement between the first entity and the second entity, authorizing delivery of a communication through the native application executing on the computing device responsive to receipt of the unique identifier at the computing device, the communication affiliated with the first entity.

23. The method of claim 21, wherein rejecting delivery of the communication through the native application comprises: based on the second entity, selecting a database of parties authorized to deliver communications through the native application responsive to data transfer between the wireless beacon and the computing device; and transmitting a communication rejection for the communication in response to omission of the first entity from the database of parties.

* * * * *